US009678324B2

(12) United States Patent
Yoshida

(10) Patent No.: US 9,678,324 B2
(45) Date of Patent: Jun. 13, 2017

(54) MICROSCOPE SYSTEM

(71) Applicant: NIKON CORPORATION, Tokyo (JP)

(72) Inventor: Yuki Yoshida, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 540 days.

(21) Appl. No.: 13/933,670

(22) Filed: Jul. 2, 2013

(65) Prior Publication Data

US 2013/0293698 A1 Nov. 7, 2013

Related U.S. Application Data

(63) Continuation of application No. PCT/JP2012/000083, filed on Jan. 10, 2012.

(30) Foreign Application Priority Data

Jan. 12, 2011 (JP) ................................ 2011-003652

(51) Int. Cl.
*G02B 21/36* (2006.01)
*G02B 21/12* (2006.01)
(Continued)

(52) U.S. Cl.
CPC ......... *G02B 21/365* (2013.01); *G02B 21/125* (2013.01); *G02B 21/367* (2013.01); *G02B 27/0075* (2013.01)

(58) Field of Classification Search
CPC G02B 21/06; G02B 21/10; G02B 2027/0138; G02B 21/0032; G02B 21/125; G03F 7/70358
See application file for complete search history.

(56) References Cited

U.S. PATENT DOCUMENTS 5,717,518 A * 2/1998 Shafer .................. G02B 13/143
359/355
6,078,380 A * 6/2000 Taniguchi .............. G03B 27/68
355/52
(Continued)

FOREIGN PATENT DOCUMENTS

JP A-2001-125002 5/2001
JP A-2003-121749 4/2003
(Continued)

OTHER PUBLICATIONS

International Search Report issued in International Patent Application No. PCT/JP2012/000083 dated Apr. 3, 2012 (with translation).
(Continued)

*Primary Examiner* — Obafemi Sosanya
(74) *Attorney, Agent, or Firm* — Oliff PLC

(57) ABSTRACT

The present microscope system has: a microscope, which has a light source, an aperture stop, a condenser lens, and an objective lens; a camera, which has a microlens array and an image pickup element; and an image processing unit, which constitutes a computer. The image processing unit divides a plurality of pixels allocated to each of the microlenses into bright-field image detection regions to be used for detecting bright-field images, and dark-field image detection regions to be used for detecting darkfield images, in accordance with the size of an aperture of the aperture stop. The image processing unit generates bright-field image data of a sample and darkfield image data of the sample.

20 Claims, 12 Drawing Sheets

(51) Int. Cl.
  *G02B 27/00*  (2006.01)
  *G02B 21/06*  (2006.01)

(56) References Cited

U.S. PATENT DOCUMENTS

| | | | |
|---|---|---|---|
| 6,296,977 B1 * | 10/2001 | Kaise | G03F 7/70241 430/22 |
| 7,633,041 B2 * | 12/2009 | Furman | G01N 21/8806 250/201.2 |
| 2003/0030902 A1 | 2/2003 | Fukushima et al. | |
| 2009/0128658 A1 | 5/2009 | Hayasaka et al. | |
| 2010/0194921 A1 | 8/2010 | Yoshioka | |
| 2013/0128087 A1 * | 5/2013 | Georgiev | H04N 5/2254 348/307 |

FOREIGN PATENT DOCUMENTS

| | | |
|---|---|---|
| JP | A-2009-21683 | 1/2009 |
| JP | A-2009-124213 | 6/2009 |
| JP | A-2010-183316 | 8/2010 |

OTHER PUBLICATIONS

Jul. 25, 2013 International Preliminary Report on Patentability issued in PCT/JP2012/000083.

* cited by examiner

MICROSCOPE SYSTEM

This is a Continuation of Application No. PCT/JP2012/000083 filed Jan. 10, 2012, which claims the benefit of Japanese Patent Application No. 2011-003652 filed Jan 12, 2011. The disclosure of the prior applications are hereby incorporated by reference herein in their entirety.

TECHNICAL FIELD

The present invention relates to a microscope system.

TECHNICAL BACKGROUND

Bright-field observation and darkfield observation are typical methods for microscope observation. For example, in the semiconductor manufacturing process, bright-field observation is used for observing pattern defects or the like, and darkfield observation is used for observing a mirror surface, flaws, dust, and the like which are difficult to see using bright-field observation (e.g., see patent document 1).

PRIOR ARTS LIST

Patent Documents

Patent Document 1: Japanese Laid-open Patent Publication No. 2001-125002 (A)

SUMMARY OF THE INVENTION

Problems to be Solved by the Invention

However, it is difficult to carry out these observation methods simultaneously. Also, when an attempt is made to switch between these observation methods in accordance with the type and characteristics of a sample, the brightness of the illuminating light and the state of the stop must be adjusted in conformance to the observation method after each instance of modification, and this requires laborious operation.

In conventional microscopy, switching the observation method involves time-consuming steps in that image pickup must be carried out for each method even when the field of view is the same. Furthermore, each photograph is acquired and saved as a separate image file, and management is therefore arduous in that, among other reasons, file names must be devised so that the relationship or the like between this plurality of image files can be understood at a later time, and a save location must be obtained because the data becomes voluminous.

The present invention was developed in view of the problems described above, and an object thereof is to provide a microscope system that can simultaneously acquire, e.g., a bright-field image and a darkfield image.

Means to Solve the Problems

The microscope system of the present invention for achieving the abovementioned objects comprises: an illumination optical system having a numerical aperture-stipulating member for stipulating a numerical aperture of illumination light from a light source; an objective lens for receiving light from a sample irradiated by the illumination light; a micro optical element array composed of a plurality of micro optical elements arranged in positions where light is received from the sample via the objective lens; an image pickup element for generating image pickup data on the basis of light received by a plurality of pixels via the micro optical elements, the plurality of pixels being allocated to each of the micro optical elements; and an image processing unit for carrying out a predetermined process on image pickup data generated by the image pickup element, wherein, the image processing unit specifies a first pixel region and a second pixel region from among the plurality of pixels allocated to the micro optical elements, in accordance with the numerical aperture of the illumination light, the focal distance of the objective lens and numerical aperture of the objective lens, generates first image data of the sample by processing the image pickup data obtained on the basis of the light received in the first pixel region, and generates second image data of the sample by processing the image pickup data obtained on the basis of the light received in the second pixel region.

The microscope system described above preferably comprises a display unit for displaying the image pickup data having been subjected to the predetermined process by the image processing unit, wherein the display unit receives an output from the image processing unit and simultaneously displays the first image data and the second image data.

In the microscope system described above, it is preferred that the numerical aperture-stipulating member be a variable aperture stop, and the size of the aperture of the variable aperture stop be adjusted to vary the numerical aperture of the illumination light.

In the microscope system described above, it is preferred that the numerical aperture-stipulating member be a spatial optical modulation element for modulating the intensity distribution of the illumination light, and that the amount of modulation of the spatial optical modulation element be adjusted to vary the numerical aperture of the illumination light.

In the microscope system described above, it is preferred that the first image data be bright-field image data and that the second image data be darkfield image data.

Another microscope system of the present invention comprises: an illumination optical system having an optical member in which slit-shaped regions having mutually different transmission factors in relation to illumination light from the light source have been set; an objective lens for receiving light from a sample irradiated by the illumination light; a micro optical element array composed of a plurality of micro optical elements arranged in positions where light is received from the sample via the objective lens; an image pickup element for generating image pickup data on the basis of light received by a plurality of pixels via the micro optical elements, the plurality of pixels being allocated to each of the micro optical elements; and an image processing unit for carrying out a predetermined process on image pickup data generated by the image pickup element, wherein in accordance with the size of the slit-shaped regions, the focal distance of the objective lens and numerical aperture of the objective lens, the image processing unit generates contrast observation image data of the sample by processing the image pickup data obtained on the basis of the light received by a plurality of pixel regions from among the plurality of pixels allocated to the micro optical elements, and generates bright-field image data of the sample by processing the image pickup data obtained on the basis of the light received by a predetermined pixel.

In the microscope system described above, it is furthermore preferred that the optical member be a spatial optical modulation element for modulating the intensity distribution of the illumination light, and the slit-shaped regions can be set in an arbitrary position.

In the microscope system described above, it is furthermore preferred that the micro optical element array be disposed in a position substantially conjugate with the sample, and the image pickup plane of the image pickup element be disposed in a position substantially conjugate with the pupil plane of the objective lens.

In the microscope system described above, it is furthermore preferred that the micro optical element array be disposed in a position substantially conjugate with the pupil plane of the objective lens, and the image pickup plane of the image pickup element be disposed in a position substantially conjugate with the sample.

Advantageous Effects of the Invention

In accordance with the present invention, it is possible to provide a microscope system that can simultaneously acquire a bright-field image and a darkfield image in a single photograph.

BRIEF DESCRIPTION OF THE DRAWINGS

FIG. 7 is an example of an observed image showing the image of a sample displayed on a screen, wherein FIG. 7A is only a bright-field image, FIGS. 7B to D are images in which a bright-field and a darkfield have been combined, and FIG. 7E is only a darkfield image;

FIG. 10 is a view showing a pattern example of the spatial optical modulation element and the receiving state in the ML regions when the pattern is projected through microlenses, and also shows a pattern example displayed on a spatial optical modulation element and the receiving state of the ML regions at that moment, wherein

FIG. 11 is a photograph showing an egg cell image observed using contrast observation, wherein

DESCRIPTION OF THE EMBODIMENTS

Figure 1:
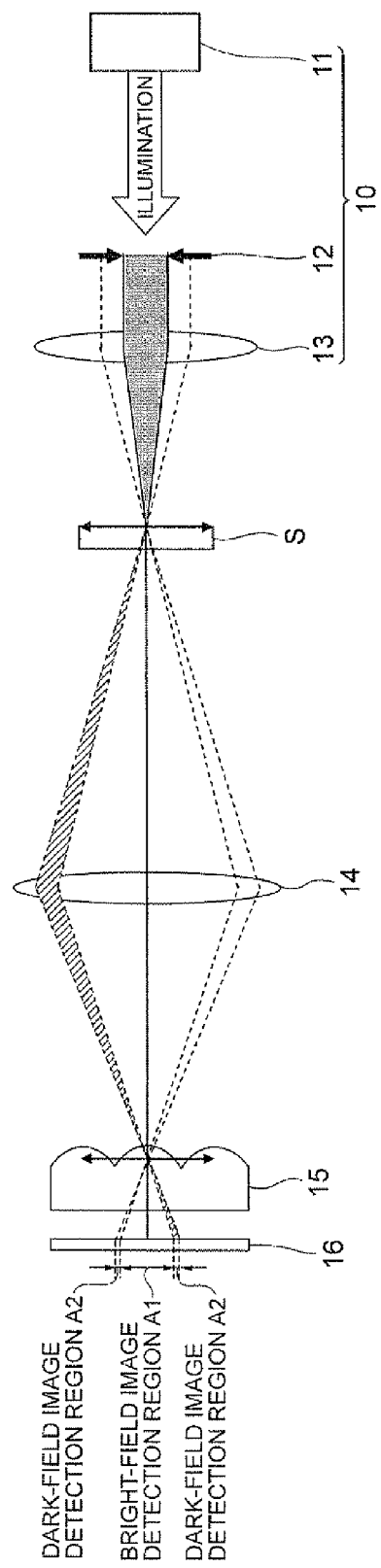
FIG. 1 is a schematic view of the optical system of the present embodiment.

The present embodiment will be described below with reference to the drawings. In the description below, the same reference numerals are used for mutually the same or corresponding constituent elements, and a duplicative description may be omitted.

First, an outline of the optical system of the present embodiment will be described with reference to FIG. 1. As shown in FIG. 1, the present optical system has: a light source 11, an aperture stop 12, and a condenser lens 13, and also has an illumination optical system 10 for irradiating a sample S with illumination light, an objective lens 14, and a microlens array 15 composed of a two-dimensionally arranged plurality of microlenses ML, and an image pickup element 16.

In the present embodiment, the microlens array 15 is placed in the plane in which the surface of the sample S (hereinafter referred to at times as "sample surface S") is to be imaged by the objective lens 14, and the image pickup element 16 is placed in a position set at the focal distance of the microlenses ML. In this case, the image pickup surface of the image pickup element 16 is substantially conjugate with the exit pupil of the objective lens 14 (via the microlenses ML). The image of the sample formed on the microlens array 15 by this configuration is divided by the microlenses ML, and the pupil images that correspond to the divided regions of the sample image (sample S) is formed on the image pickup plane of the image pickup element 16. In other words, when a plurality of the pupil images thus formed is superimposed on the image pickup plane of the image pickup element 16, the pupil images that correspond to the divided regions are the pupil images of an objective lens formed by a so-called ordinary lens.

In the present embodiment as described above, a configuration was described in which the microlens array 15 is arranged in a position substantially conjugate with the sample S, and the image pickup plane of the image pickup element 16 and the exit pupil of the objective lens 14 are substantially conjugate, but it is also possible to use a configuration in which the microlens array 15 is arranged in a position substantially conjugate with the exit pupil of the objective lens 14, and the image pickup plane of the image pickup element 16 and the sample surface S are substantially conjugate. The same effect can be obtained in either case. In other words, the pupil image formed by the microlens array 15 is divided by the microlenses ML and the sample images that correspond to the divided regions of the pupil image are formed on the image pickup plane of the image pickup element 16.

Figure 2:
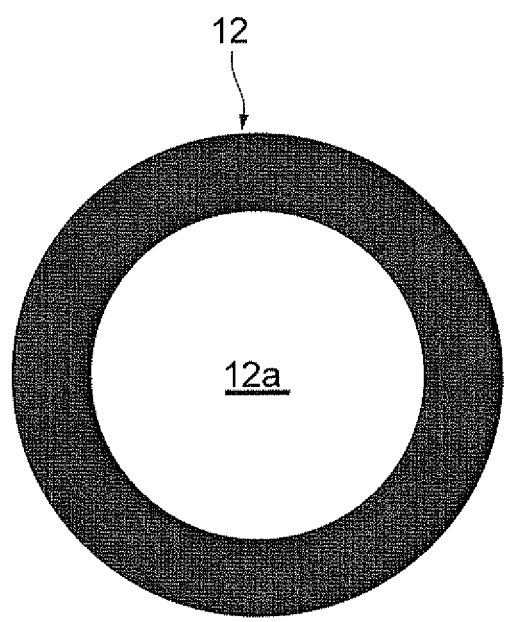
FIG. 2 is a view showing the aperture stop used in the optical system of the present embodiment.

The aperture stop 12 specifies the numerical aperture of the illumination light emitted from the light source 11. The aperture stop 12 has a circular aperture 12a in the center, as shown in FIG. 2, and the numerical aperture of the illumination light can be varied by adjusting the size of the aperture 12a.

In this case, the maximum diameter of the aperture 12a in the aperture stop 12 is different depending on the combination of the condenser lens 13 and the objective lens 14. Also, the size of the aperture 12a in the aperture stop 12 is determined by the pupil diameter of the objective lens 14 and the magnification from the pupil of the objective lens 14 to the aperture stop 12. However, the magnification from the pupil of the objective lens 14 to the image pickup element 16 does not vary even when the objective lens is switched, and it is therefore sufficient to have the information about the objective lens (numerical aperture and focal distance).

FIG. 1 shows the numerical aperture of the illumination light (the size of the aperture 12a in the aperture stop 12) to be less than the numerical aperture of the objective lens 14, and shows that direct light does not reach the periphery of the pupil of the objective lens 14.

The microlens array 15 is an optical element in which a plurality of microlenses ML is lined up in two dimensions. In the example of FIG. 1, a 3×3 microlens array is envisioned in order to simplify the description, and three of those microlenses in the vertical direction are shown in the drawing. The actual number of microlenses ML can be set, as appropriate, in accordance with the resolution required in the image signal to be picked up by the image pickup element 16.

The image pickup element 16 receives light from the microlens array 15 to acquire image pickup data. The image pickup element 16 is, e.g., a sensor composed of a two-dimensionally arrayed plurality of charge coupled devices (CCD), complementary metal oxide semiconductors (CMOS) or the like, and has a predetermined number of pixels allocated in correspondence to the microlenses ML so as to receive light that has passed through the microlenses ML constituting the microlens array 15. The number of pixels that a single microlens ML covers is, e.g., 8×8, and the luminous flux that passes through each microlens ML is received by the corresponding pixels.

Using a configuration such as that described above, a plurality of images from the exit pupil of the objective lens 14 is formed on the image pickup plane of the image pickup element 16, the objective lens being formed by the microlenses ML for each region of the sample image (sample 8) divided by the microlens array 15. Hereinbelow, regions in which an image can be formed by the microlenses ML in the image pickup plane of the image pickup element 16 will be referred to as ML regions.

Figure 3:
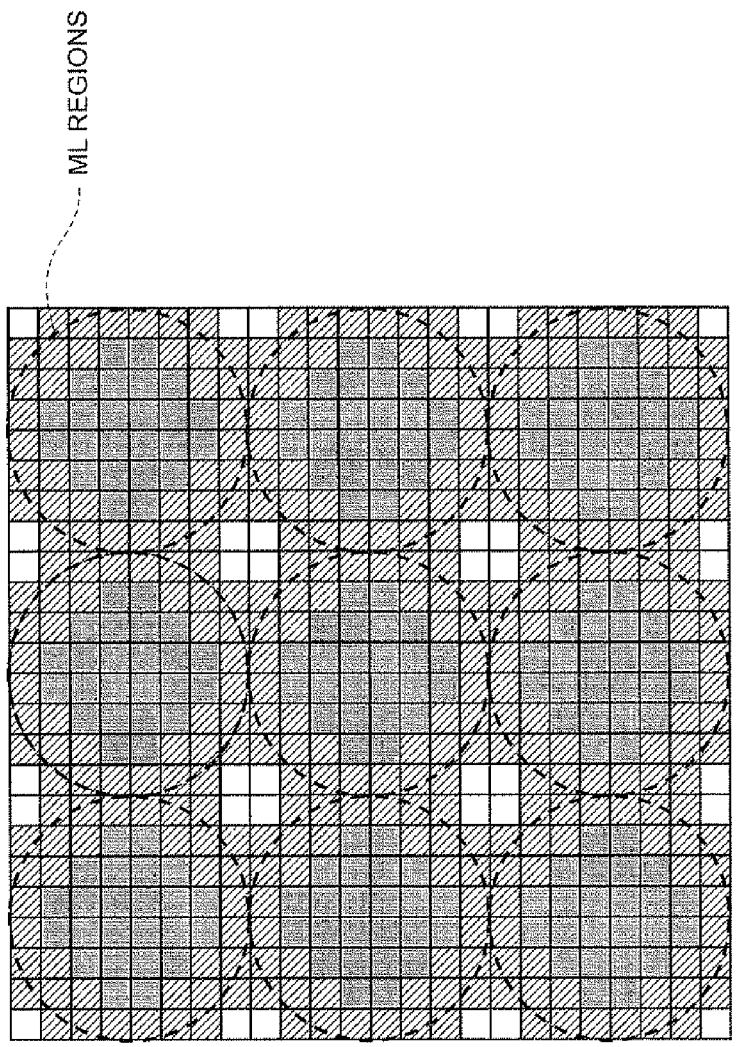
FIG. 3 is a view showing an example of the ML regions on the image plane of an image pickup element.

FIG. 3 is a view showing an example of the ML regions (dotted lines in the drawing) on the image plane of an image pickup element 16. In FIG. 3, each of the 24×24 squares arrayed in the form of a grating represents a pixel on the image pickup plane of the image pickup element 16, and the 3×3 circles drawn by dotted lines represent ML regions formed by the microlenses ML, i.e., pupil images of the objective lens 14 formed by the microlenses ML in each of the regions of the sample image (sample S) divided by the microlens array 15. In other words, in the example of FIG. 3, the images formed by the nine microlenses ML constituting the microlens array 15 form ML regions on an 8×8 pixel group on the image pickup plane of the image pickup element 16.

It is possible to use the image signals obtained in these nine ML regions to determine on which microlens ML among the plurality of microlenses ML constituting the microlens array 15 the light incident on the image pickup plane of the image pickup element is incident, and through which position of the pupil in the objective lens 14 the light passed. In other words, when the light rays are considered in geometric terms, the position in which the light rays are incident on the image plane (the position of the microlens array 15) and the position at which the light rays emerge from the exit pupil of objective lens 14 can be known, and the light rays incident on an arbitrary image plane can be specified. Computation related to collecting light in an arbitrary image plane on the optical axis is thereby made possible (e.g., the refocus technique described in Japanese Laid-open Patent Publication No. 2007-4471), and picture images in arbitrary image planes can be acquired.

In the present embodiment, the interior of each of the ML regions is divided into bright-field image detection regions A1 (the white portions of FIG. 3) to be used for detecting bright-field images (which are regions in which direct illumination light is incident), and dark-field image detection regions A2 (the hatched portion of FIG. 3) to be used for detecting darkfield images (which are regions in which direct illumination light is not incident), in accordance with the numerical aperture of the illumination light stipulated by the aperture stop 12, specifically, the size of the aperture stop 12a in the aperture stop 12, and the numerical aperture and focal distance of the objective lens 14. Bright-field image data of a sample S is generated from image signals obtained by the bright-field image detection regions A1 in each of the ML regions, darkfield image data of the sample S is generated from image signals obtained by the dark-field image detection regions A2 in each of the ML regions, and a bright-field image and a darkfield image can be obtained in an arbitrary image plane as described above.

The ratio (ratio of luminous energy) of the bright-field image detection regions A1 and the dark-field image detection regions A2 in each of the ML regions can be modified when an adjustable numerical aperture of the illumination light stipulated by the aperture stop 12 is used. For example, bright-field observation uses light detected only in the bright-field image detection regions A1 in the ML regions of FIG. 3, and the size of the aperture 12a in the aperture stop 12 can therefore be increased if an increase in resolving power of the bright field is desired. Also, darkfield observation uses light detected only in the dark-field image detection regions A2 in the ML regions of FIG. 3, and the size of the aperture 12a in the aperture stop 12 can therefore be reduced if an increase in luminous energy of the bright field is desired.

When the optical system described above is used in this manner, bright-field observation and darkfield observation can be simultaneously carried out. Furthermore, the combination ratio thereof can be modified, as appropriate, in accordance with the application and/or the object to be measured.

Next, the principles of the optical system shown in FIG. 1 as described above will be described for the case in which application is made to a microscope system.

Figure 4:
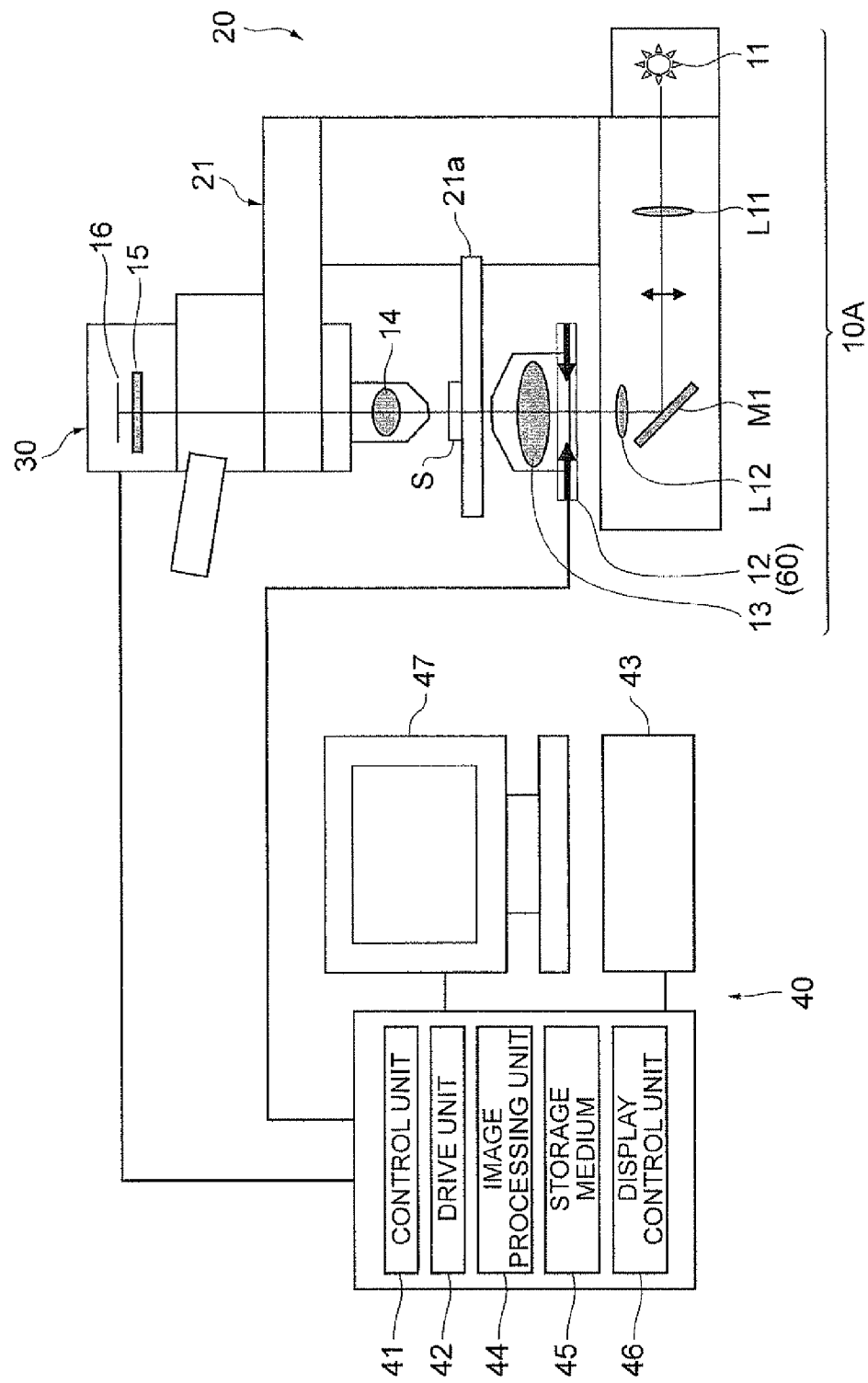
FIG. 4 is a view showing the overall configuration of the microscope system (transmission illumination) of the present embodiment.

FIG. 4 is a view showing the overall configuration of the microscope system in which the optical system described above has been applied.

The microscope system has a microscope 20, which has a microscope main unit 21 for holding a stage 21a for supporting a sample S, a transmission-illumination optical system 10A for irradiating illumination light onto the sample S, and a objective lens 14 for collecting light from the sample S; a camera 30 for picking up an image of the sample S; and a computer 40, as shown in FIG. 4. The objective lens 14 is composed of a single lens in FIG. 4 in order to simplify the description, but the objective lens may be composed of a plurality of lens as required.

The transmission-illumination optical system 10A has, in sequence of the optical path, a light source 11, a lens L11, a deflection mirror M1, a lens L12, an aperture stop 12, and a condenser lens 13.

In accordance with the transmission-illumination optical system 10A having the configured described above, illumination light emitted from the light source 11 passes through the lens L11, is reflected by the deflection mirror M1 and turned in the upward direction, passes through the lens L12 to become substantially parallel light, and is thereafter irradiated by the condenser lens 13 by way of the aperture stop 12 onto the sample S placed on the stage 21a. At this point, the light irradiated onto the sample S has an intensity distribution that is biased in the shape of a ring in accordance with the size of the aperture 12a in the aperture stop 12 (see FIG. 2).

The camera 30 is mounted on the microscope 20, and has a microlens array 15 and an image pickup element 16.

In the microscope system shown in FIG. 4, light emitted from the sample S illuminated by the illumination optical system 10A is formed by the objective lens 14 in a plane that includes the vertex position of the microlenses ML constituting the microlens array 15 in the same manner as the optical system of FIG. 1, and is conjugate with the plane that includes the focal position of the microlenses ML. In other words, the image pickup plane of the image pickup element 16 in the camera 30 is substantially conjugate with the exit pupil of the objective lens 14 via each of the microlenses ML of the microlens array 15. The sample image formed on the microlens array 15 is divided by each of the microlenses ML, and pupil images that correspond to the divided regions of the sample image (sample S) are formed on the image pickup plane of the image pickup element 16. The image pickup element 16 of the camera 30 picks up the pupil images that correspond to the divided regions of the image of the sample S and outputs the image signals thereof.

A computer 40 is connected to the microscope 20 and the camera 30, and has a control unit 41, a drive unit 42, an input device 43, an image processing unit 44, a storage medium 45, a display control unit 46, and a display 47.

The control unit 41 controls the drive unit 42, the image processing unit 44, and the display control unit 46 in compliance with instructions inputted by a user via the input device 43.

The drive unit 42 drives the image pickup element 16 and outputs image signals from the image pickup element 16 to the image processing unit 44.

The image processing unit 44 carries out predetermined image processing on the basis of the image signals fed by the drive unit 42. The image processing unit 44 also stores the image data obtained by image processing in a memory card or another storage medium 45, and displays the image data on the display 47 by using the display control unit 46. The details of image processing performed by the image processing unit 44 will be described together with the later-described operation of the image processing unit 44.

Next, the image generation processing executed by the image processing unit 44 in the computer 40 will be described with reference to the flowchart in FIG. 5.

In step S11, the image processing unit 44 acquires image signals outputted from the image pickup element 16.

In step S12, the image processing unit 44 generates (combines) the images at an arbitrary object distance on the basis of the image signals outputted from the image pickup element 16.

In the present embodiment, the image processing unit 44 divides the plurality of pixels allocated to each of the microlenses, i.e., each of the ML regions into bright-field image detection regions A1 (the white portions in the center area of the ML regions in FIG. 3) to be used for detecting bright-field images of the sample S, and dark-field image detection regions A2 (the hatched portion of the ML regions in FIG. 3) to be used for detecting darkfield images of the sample S, in accordance with the numerical aperture (e.g., the size of the aperture 12a) of the illumination light stipulated by the aperture stop 12, and the numerical aperture and focal distance of the objective lens 14. Next, the image pickup data obtained on the basis of light received in the bright-field image detection regions A1 of each of the ML regions is combined to generate bright-field image data of the sample S, the image pickup data obtained on the basis of light received in the dark-field image detection regions A2 of each of the ML regions is combined to generate darkfield image data of the sample S, and picture images on arbitrary image planes (defocus planes) when offset in the optical axis direction from the image plane (the position of the microlens array 15) are then combined on the basis of the image data.

In step S13, the image processing unit 44 obtains information about the distance in the depth direction from the plurality of generated images (picture images in arbitrary image planes) to thereby generate a stereoscopic image of the sample S, and then the image generation processing is ended.

As described above, a plurality of picture images in an arbitrary image plane is combined from the image signals obtained by the image processing unit 44 by using the configuration of the optical system in FIG. 1, information about the distance in the depth direction is calculated from the picture images in an arbitrary image plane, and a stereoscopic image of the sample S in the bright-field and darkfield is simultaneously generated.

Figure 5:
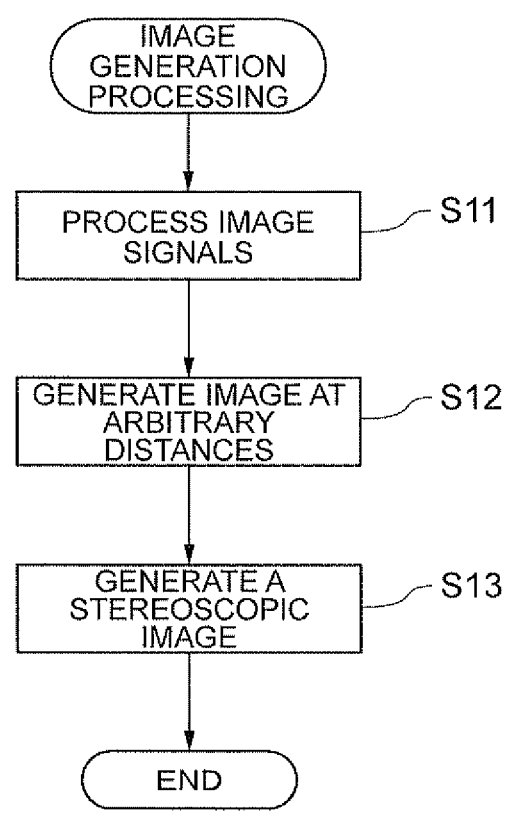
FIG. 5 is a flowchart describing image generation processing.

Images at an arbitrary object distance may be obtained on the basis of step S12 of FIG. 5. It is furthermore possible to aggregate images at different object distances and obtain an image having considerable depth. Also, images at all object distances can be aggregated to obtain a so-called all-focused image that is focused in all positions.

In the microscope system described above, user operation is implemented by operation of a mouse, keyboard, or other input device 43 based on graphical user interface (GUI) display screen displayed on the display 47. The GUI display screen is generated by the display control unit 46 in accordance with instructions from the control unit 41. The display control unit 46 superimposes a predetermined icon on the image data of the sample S obtained by the camera 30 mounted on the microscope 20 and generates a GUI display screen.

Figure 6:
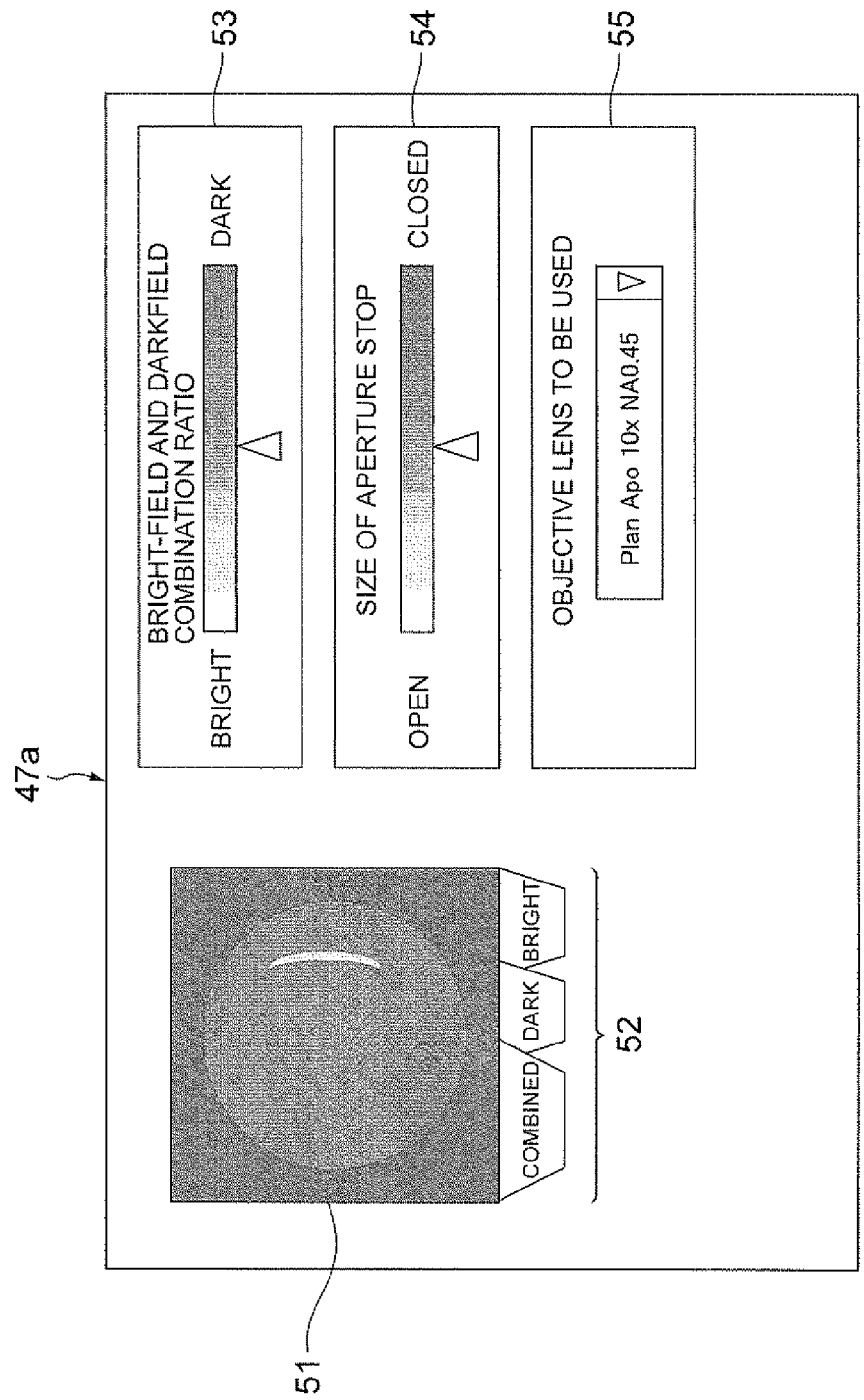
FIG. 6 is an example of the GUI display screen for operative control during bright-field and darkfield observation.

FIG. 6 is a diagram showing an example of the GUI display screen displayed on the display 47. In FIG. 6, a sample image display region 51 for displaying images of the sample S, and various icons 52 to 55 are arranged in an image display region 47a of the display 47.

Figure 7:
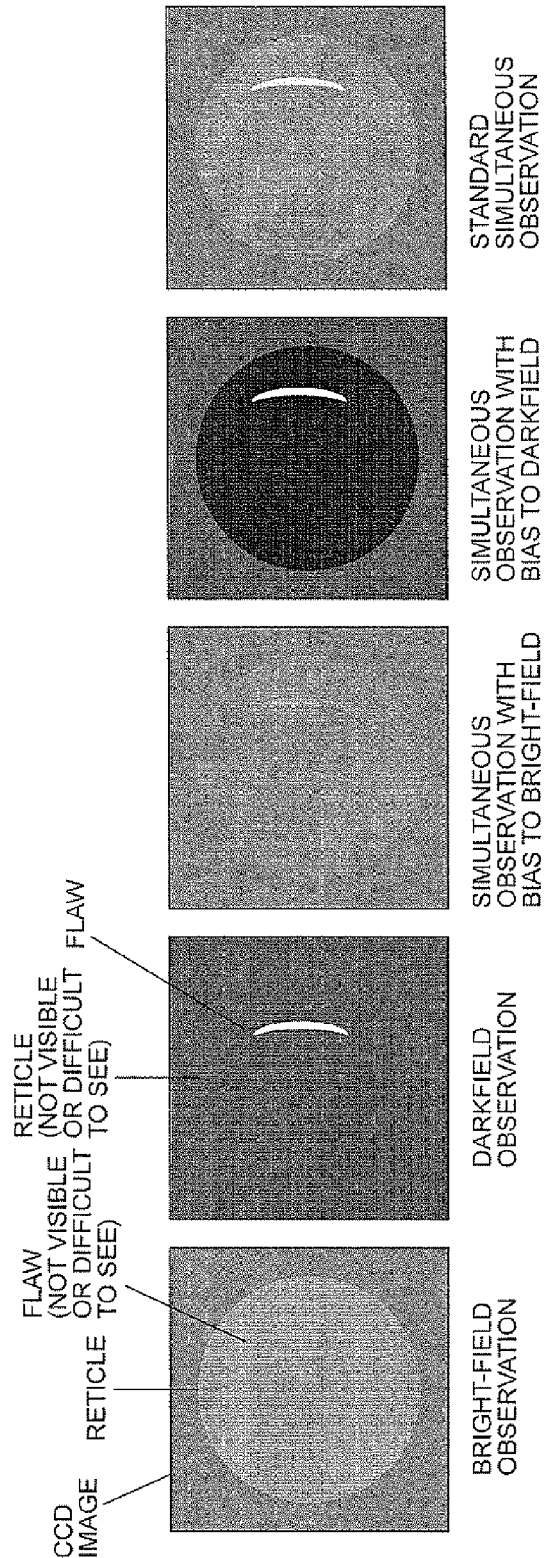

The icon 52 disposed below a sample image display region 51a is used for receiving user operation related to setting the imaging (observation) method for an image displayed in the sample image display region 51a. Operating the icon 52 makes it possible to selectively set a bright-field image such as that shown in FIG. 7A, an image in which the bright-field and the darkfield have been combined as shown in FIGS. 7B to 7D, or a darkfield image as shown in FIG. 7E, as the image to be displayed in the sample image display region 51a.

Rather than displaying a bright-field image, a darkfield image, or a combined image of a bright-field image and a darkfield image as in FIG. 6, it is also possible to line up and display these three images at the same time as the image to be displayed in the sample imaged splay region 51a.

The icons 53 to 55 disposed in the region to the right of the image display region 47a are used for receiving user operation related to setting image display conditions. In the present embodiment, the icon 53 is operated to set the combination ratio between the bright-field image and the darkfield image, the icon 54 is operated to set the size of the aperture 12a in the aperture stop 12, and the icon 55 is operated to set the objective lens 14 (the numerical aperture and magnification (focal distance)) to be used. The icons provided on the GUI display screen are not limited to these and may be suitably increased or reduced in number.

In accordance with such a configuration, merely operating the icons 52 to 55 allows the user to display a desired observation image such as FIGS. 7A to 7E on the screen in accordance with the type of sample S and/or the intended use of the observation.

In a specific example of the case in which the sample S is a reticle, the icon 53 can be operated to increase the ratio of the bright-field image displayed in the manner of FIG. 7B if screening for flaws while the reticle pattern is viewed. Also, when there is a desire to avoid missing small flaws in the reticle, the ratio of the darkfield image displayed in the manner of FIG. 7C can be increased. Naturally, as shown in FIG. 7D, it is also possible to use an image in which the ratio of the bright-field image and the darkfield image is equal to carry out the inspection.

In the case that a reticle is to be inspected in a conventional microscope system, an image of the reticle is picked by a camera mounted on the microscope system, and an image of the reticle is projected on a display. However, since bright-field observation and darkfield observation cannot be carried out simultaneously, switching must be carried out for each observation. Although it is possible to capture the outer shape of the reticle and to recognize a pattern from a bright-field observation (image), it is difficult to check for flaws. Nevertheless, flaws in the reticle can be readily viewed from a darkfield observation (image), but it is difficult to perceive the outer shape of the reticle and to specify the position of flaws. Also, assuming one were to view and compare the bright-field image and the darkfield image to specify the position of flaws, the files are different and must therefore be skillfully correlated and saved, or it is otherwise difficult to confirm which separately acquired bright-field image corresponds to which darkfield image.

In contrast to the above, using the microscope system of FIG. 4 as described above makes it possible to simultaneously acquire a bright-field image and a darkfield image of the sample S, and to save and display the images on a screen. It is furthermore possible to modify, as appropriate, the combination ratio of the images in accordance with the application and/or the object to be measured. As a result, the image to be displayed on the display 47 can be optimized and the precision for observing the sample S can be improved via the display 47 or another display device. It is also possible to reduce the burden on the user and to bring about an improvement in work efficiency.

The configuration requirements of the embodiments have been described above, but it is apparent that the present invention is not limited thereby.

Figure 8:
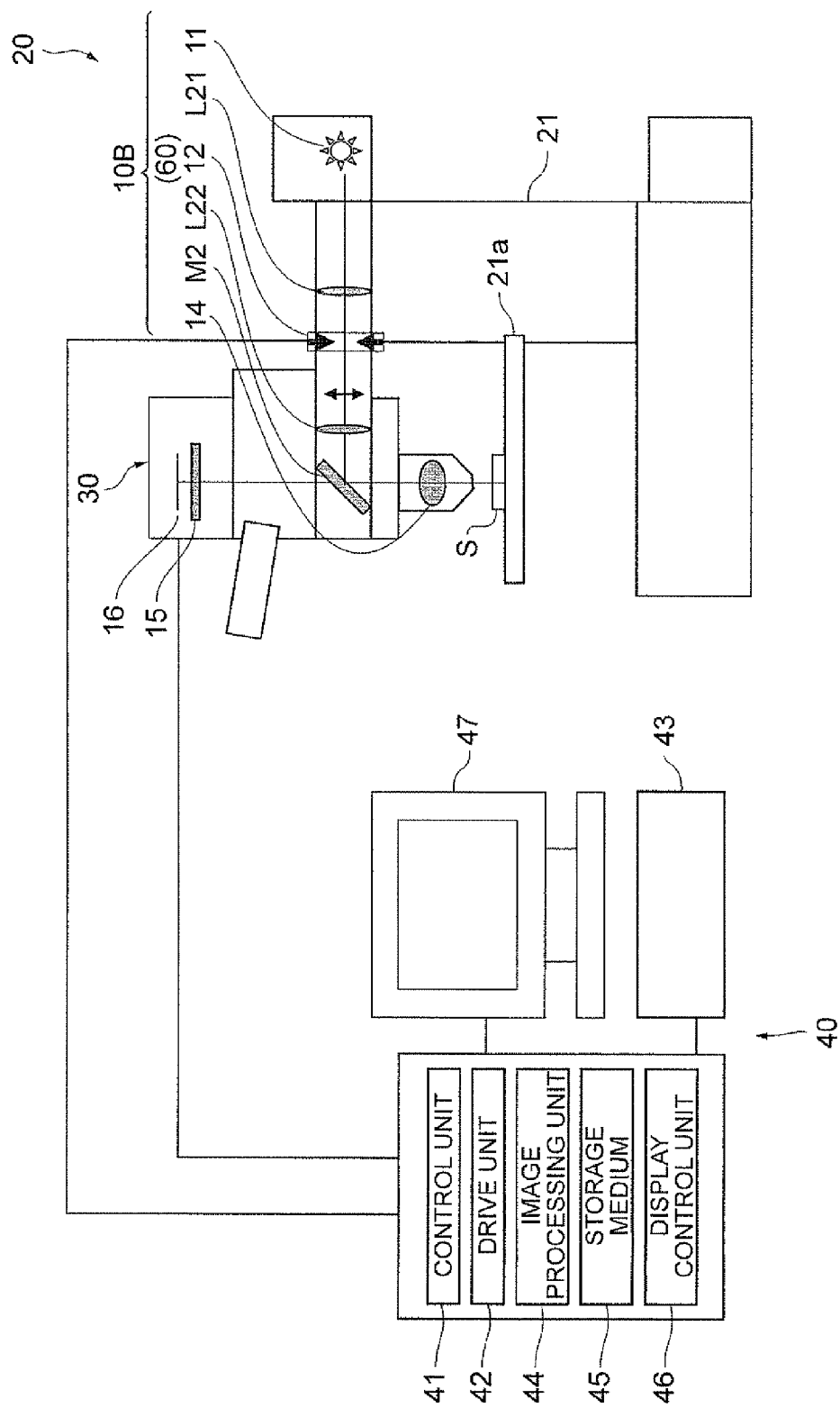
FIG. 8 is a view showing the overall configuration of the microscope system (during epi-illumination) of the present embodiment.

For example, the case in which a transmission-illumination optical system 10A (see FIG. 4) is used was described as the illumination optical system in the microscope system described above, but it is also possible to use an epi-illumination optical system. In this case, the epi-illumination optical system 10B has, in sequence along the optical path, a light source 11, a lens L21, and aperture stop 12, a lens L22, a dichroic mirror M2, and an objective lens 14 that doubles as a condenser lens, as shown in FIG. 8. Illumination light emitted from the light source 11 passes through the lens L21, the aperture stop 12, and lens 102 in sequence, is reflected by the dichroic mirror M2 and turned downward, and is thereafter irradiated via the objective lens 14 onto the sample S placed on the stage 21a, but the microscope system described above can otherwise be used without modification and simultaneous observation of the bright-field and the darkfield can be carried out.

In this case, the microlens array 15 is disposed in a position substantially conjugate with the sample S, and the image pickup plane of the image pickup element 16 is conjugate with the pupil plane of the objective lens 14. However, the microlens array 15 may be disposed in a position substantially conjugate with the t pupil of the objective lens 14, and the image pickup plane of the image pickup element 16 may be disposed in a position that is conjugate with the sample S. In either case, the same effect as in the microscope system of FIG. 4 can be obtained. In other words, the pupil image formed by the microlens array 15 is divided by each of the microlenses ML and the sample images that correspond to the divided regions of the pupil image are formed on the image pickup plane of the image pickup element 16.

Also, in the embodiment described above, an aperture stop 12 in which the size of the aperture 12a can be varied was used as means for stipulating the numerical aperture of the illumination light, but instead of this, it is also possible to use a spatial optical modulation element 60 that can modulate the intensity distribution of the illumination light.

The spatial optical modulation element 60 is capable of modulating the intensity distribution of illumination light, as shown in FIGS. 10A to 10E, and may be, e.g., a digital micro-mirror device (DMD), a liquid crystal display, a liquid crystal on silicon (LODS), or the like.

Figure 9:
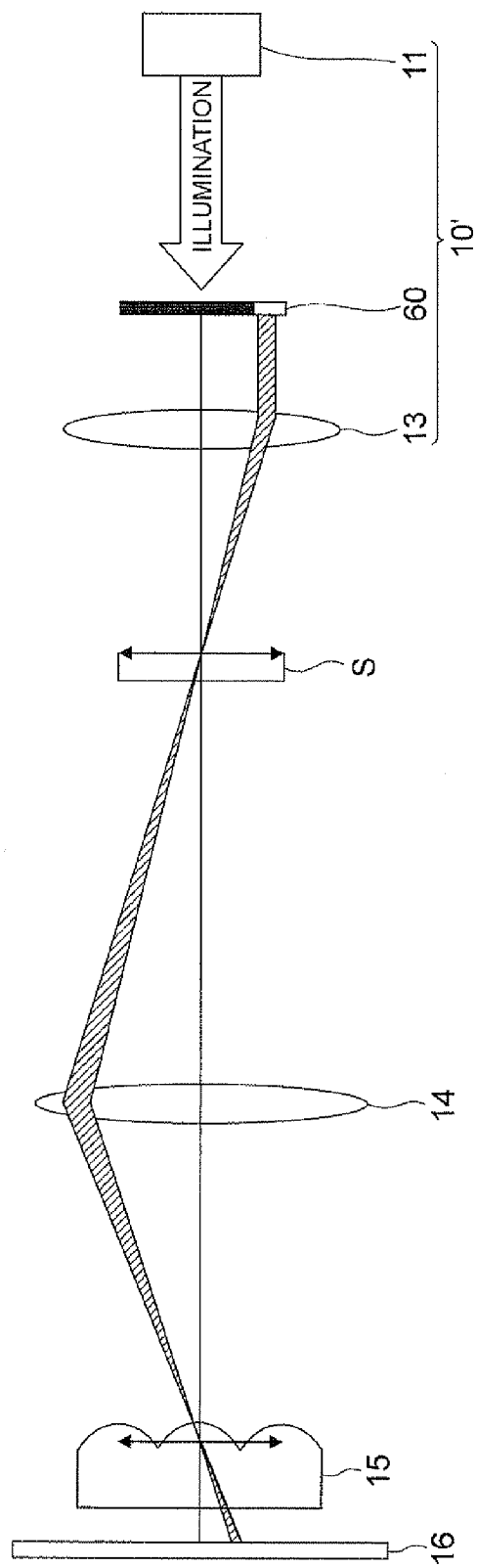
FIG. 9 is a descriptive view of when spatial optical modulation element is used in the optical system of the present embodiment.

The illumination optical system 10' in which such a spatial optical modulation element 60 is used has, in sequence of the optical path, a light source 11, the element 60, and a condenser lens 13, as shown in FIG. 9. Illumination light emitted from the light source 11 is modified in intensity in a desired position by the spatial optictal modulation element 60, and is thereafter irradiated via the condenser lens 13 onto the sample S placed on the stage 21a, but the microscope system described above can otherwise be used without modification and simultaneous observation of the bright-field and the darkfield can be carried out (see FIGS. 4 and 8).

Figures 10A, 10B, 10C, 10D, 10E:
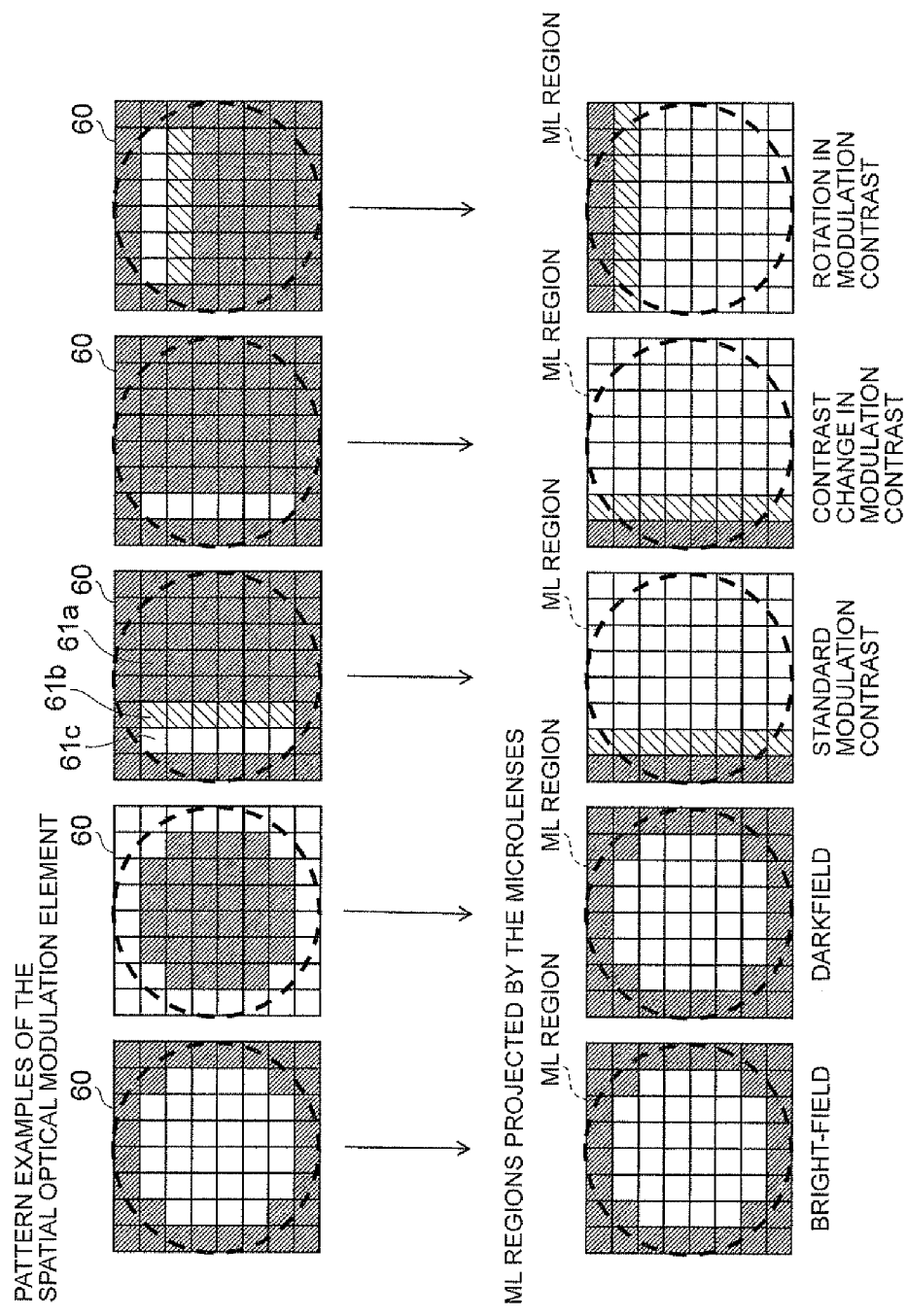
FIG. 10A is adapted for forming a bright-field observation image.
FIG. 10B is for forming a darkfield observation image.
FIG. 10C is adapted for forming a modulation contrast observation image.
FIG. 10D represents the case in which the pattern contrast of FIG. 10C has been varied.
FIG. 10E is the case in which the pattern of FIG. 10C has been rotated.

However, in the case that bright-field observation is to be carried out, a ring-shaped pattern such as that shown in FIG. 10A in which the white portion in the center has a transmission ratio of 1 and the other shaded portions have a transmission ratio of 0 is displayed on the spatial optical modulation element 60. In the case that darkfield observation is to be carried out, a ring-shaped pattern such as that shown in FIG. 10B in which the black portion in the center has a transmission ratio of 0 and the other white portions have a transmission ratio of 0 is displayed on the spatial optical modulation element 60. The light emitted on the sample S has an intensity distribution that is biased in accordance with the ring-shaped pattern displayed on such a spatial optical modulation element 60.

The parameters of the spatial optical modulation element 60 are the ring diameter, the ring width, the transmission ratio inside the ring, and the transmission ratio outside the ring, of the ring-shaped pattern to be displayed. Therefore, these parameters can be adjusted in accordance with the application and/or the object to be measured, whereby the desired numerical aperture of the illumination light can be set, and bright-field and darkfield observation can be carried out simultaneously in the same manner as when the aperture stop 12 is used as described above.

Figure 11B:
FIG. 11B shows the case in which illuminating light has been irradiated from a different direction from FIG. 11A.
Figure 11A:
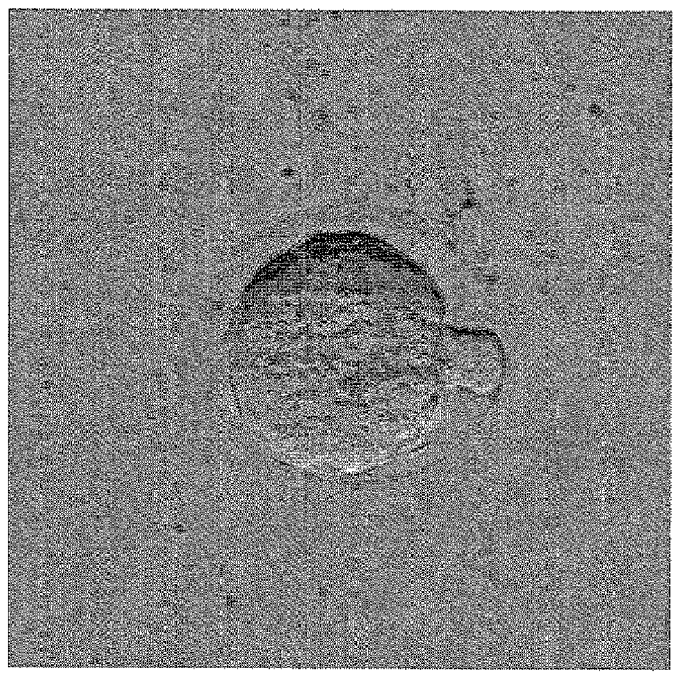
FIG. 11A shows the case in which illuminating light has been irradiated from a certain direction.

In the spatial optical modulation element 60, a pattern composed of a low transmission ratio region 61a, an intermediate transmission ratio region 61b, and a high transmission ratio region 61c in which the transmission ratios of the slit shapes are mutually different such as shown in FIG. 10C can be displayed, whereby Hoffman modulation contrast observation (hereinafter may also be referred to as contrast observation) can be carried out. In accordance with this observation method, the image can be observed as a stereoscopic image having directionality and intensified contrast even when the sample S is transparent (in this case an egg cell), as shown in FIGS. 11A and 11B.

The transmission ratio of the high transmission ratio regions can be set to 100%, and an image of the sample S can be generated from image signals obtained from a plurality of pixels in ML regions that correspond to the high transmission ratio regions, whereby a bright-field image (in an arbitrary image plane) can be generated. In other words, in this case, an image of contrast observation and an image of bright-field observation can be simultaneously acquired in a single photograph.

In order to carry out contrast observation in a conventional microscope system, it is necessary to insert a light-blocking member in the position of the pupil of the objective lens, to prepare dedicated objective lens, or to find other means, and such is very costly. However, using a spatial optical modulation element 60 such as that described above allows manufacturing costs to be kept low because contrast observation can be performed without the need for a light-blocking member or a dedicated objective lens. Furthermore, there is no member for reducing light in the optical path from the objective lens to the camera, and it is therefore possible to obtain a bright, excellent sample image.

Conventionally, in contrast observation, the slit on the condenser side must be rotated, the objective lens must also be rotated, and other laborious and very difficult work must be performed in the rase that the illumination light irradiation direction is to be changed in relation to the sample S. However, in the present embodiment, the pattern to be displayed on the spatial optical modulation element 60 is modified as if rotation has occurred from FIG. 10C to FIG. 10E, and the pixel position in the ML regions used during image acquisition is merely modified, whereby the illumination direction can be modified in a siruple manner. Here, FIG. 11A shows an image of the sample (egg cell) picked up by receiving illumination light from a certain direction, and FIG. 11B shows an image of the sample (egg cell) picked up by varying the illumination direction.

Figure 12:
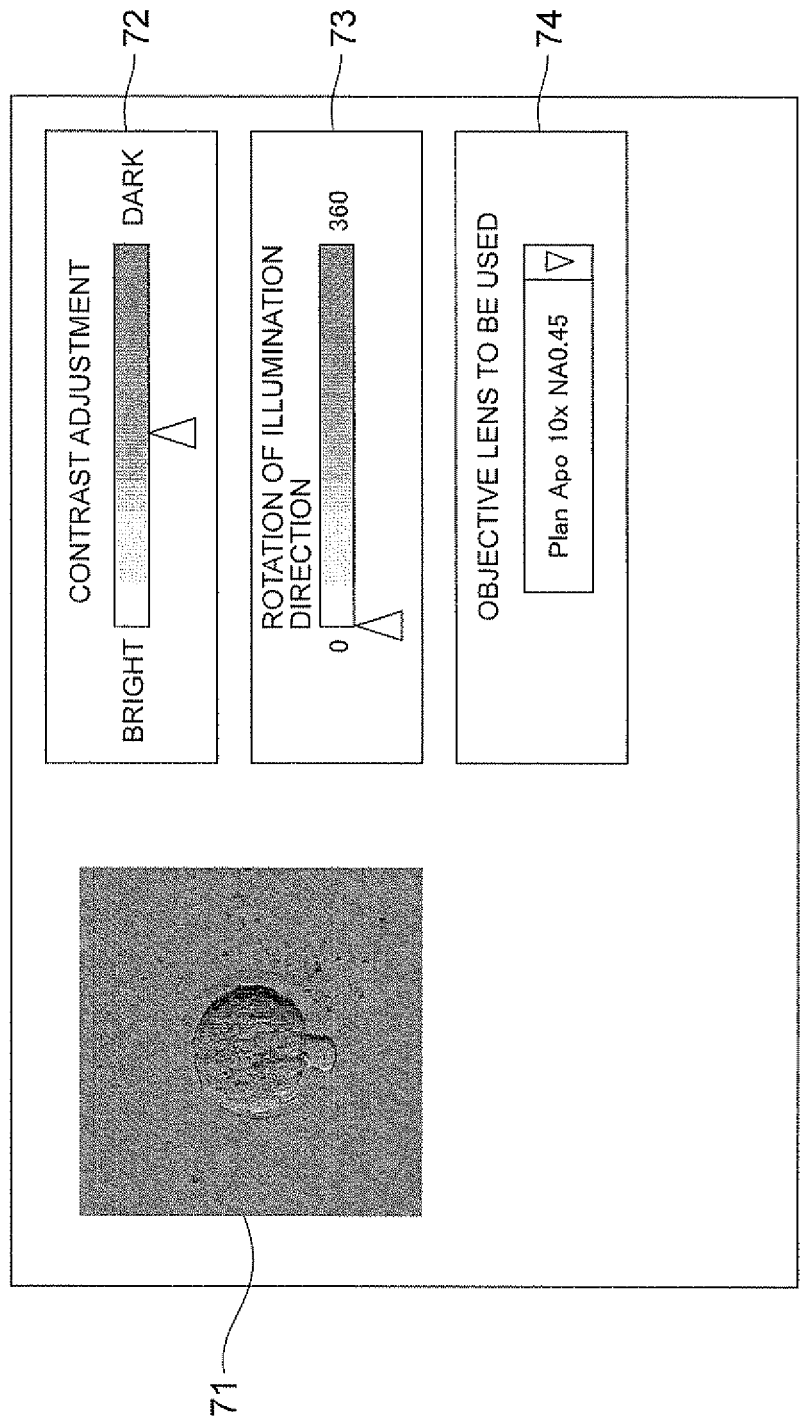
FIG. 12 is an example of a GUI display screen for operative control during contrast observation.

The parameters of the spatial optical modulation element 60 during contrast observation are the slit width, the transmission ratio of the slit part, and the slit position. These parameters can be adjusted by suitably operating an icon 72 for adjusting the contrast and an icon 73 for setting the illumination direction of the illumination light, while a sample image display region 71 is viewed, the sample image display region 71 being provided on, e.g., a GUI display screen such as that shown in FIG. 12 and being used for displaying the contrast observation image of the sample S. In the GUI display screen shown in FIG. 12, an icon 74 for selectively setting the objective lens to be used is also provided in addition to the icons 72 and 73 for parameter adjustment, and contrast observation can be carried out in a more optimal state.

As described above, using a spatial optical modulation element 60 in the above-described microscope system shown in FIGS. 4 and 8 makes it possible to arbitrarily select bright-field observation, darkfield observation, or contrast observation by adjustment of the pattern to be displayed on the element 60. An image of bright-field observation and an image of darkfield observation can be simultaneously acquired in a single photograph.

A stereoscopic microscope was described above, but it is apparent that application can also be made to an inverted microscope.

EXPLANATION OF NUMERALS AND CHARACTERS 10, 10': illumination optical system
10A: transmission-illumination optical system
10B: epi-illumination optical system
11: light source
12: aperture stop
13: condenser lens
14: objective lens
15: microlens array
16: image pickup element
20: microscope
30: camera
40: computer
41: control unit
42: drive unit
43: input device
44: image processing unit
45: storage medium
46: display control unit
47: display
60: spatial optical modulation element
S: sample

The invention claimed is:

1. A microscope system comprising:
an illumination optical system having a numerical aperture stipulating member which sets a numerical aperture of illumination light to be irradiated on a sample;
an image pickup element having a plurality of pixels which receives at least a part of light from the sample irradiated by the illumination optical system;
an objective lens provided between the sample and the image pickup element;
a micro optical element array provided between the objective lens and the image pickup element, the micro optical element array being composed of a plurality of micro optical elements arranged two-dimensionally; and
an image processing part that generates a plurality of image data based on light received in a plurality of different pixel regions of the image pickup element, and generates a combined image data by combining the plurality of image data using a combination ratio.

2. The microscope system according to claim 1, wherein the numerical aperture stipulating member is a variable aperture stop, and
the numerical aperture of illumination light from the light source is varied by adjusting a aperture size of the variable aperture stop.

3. The microscope system according to claim 1, wherein the numerical aperture of illumination light is smaller than a numerical aperture of the objective lens.

4. The microscope system according to claim 1, wherein the image processing part generates first image data based on light received in a first pixel region of the image pickup element, and second image data based on light received in a second pixel region of the image pickup element.

5. The microscope system according to claim 4, wherein the first image data is bright-field image data, and the second image data is dark-field image data.

6. The microscope system according to claim 1, wherein
the numerical aperture stipulating member is a spatial optical modulation element which modulates intensity distribution of the illumination light, and
a aperture size of the illumination light is varied by adjusting an amount of modulation of the spatial optical modulation element.

7. The microscope system according to claim 1, wherein
the micro optical element array is disposed in a position substantially conjugate with the sample, and
an image pickup plane of the image pickup element is disposed in a position substantially conjugate with a pupil plane of the objective lens.

8. The microscope system according to claim 1, wherein
the micro optical element array is disposed in a position substantially conjugate with a pupil plane of the objective lens, and
an image pickup plane of the image pickup element is disposed in a position substantially conjugate with the sample.

9. A microscope system comprising:
an illumination optical system having an optical member which sets an intensity distribution of illumination light;
an image pickup element having a plurality of pixels which receives at least a part of light from a sample irradiated by the illumination optical system;
an objective lens provided between the sample and the image pickup element;
a micro optical element array provided between the objective lens and the image pickup element, the micro optical element array being composed of a plurality of micro optical elements arranged two-dimensionally; and
an image processing part that generates a plurality of image data based on light received in a plurality of different pixel regions of the image pickup element, and generates a combined image data by combining the plurality of image data using a combination ratio.

10. The microscope system according to claim 9, wherein
the image processing part generates first image data based on light received in a first pixel region of the image pickup element, and second image data based on light received in a second pixel region of the image pickup element.

11. The microscope system according to claim 10, wherein the first image data is bright-field image data, and the second image data is dark-field image data.

12. The microscope system according to claim 9, wherein the optical member is a spatial optical modulation element.

13. The microscope system according to claim 9, wherein
the micro optical element array is disposed in a position substantially conjugate with the sample, and
an image pickup plane of the image pickup element is disposed in a position substantially conjugate with a pupil plane of the objective lens.

14. The microscope system according to claim 9, wherein
the micro optical element array is disposed in a position substantially conjugate with a pupil plane of the objective lens, and
an image pickup plane of the image pickup element is disposed in a position substantially conjugate with the sample.

15. The microscope system according to claim 1, further comprising:
an input part to set the combination ratio.

16. The microscope system according to claim 9, further comprising:
an input part to set the combination ratio.

17. The microscope system according to claim 1, further comprising a display part which displays the combined image data.

18. The microscope system according to claim 9, further comprising a display part which displays the combined image data.

19. The microscope system according to claim 17, wherein the display part is configured to display the first and the second image data.

20. The micropscope system according to claim 18, wherein the display part is configured to display the first and the second image data.

* * * * *